United States Patent [19]

Latvys

[11] Patent Number: 4,736,961
[45] Date of Patent: Apr. 12, 1988

[54] WHEEL SUSPENSION SYSTEM

[76] Inventor: Evaldas J. Latvys, 1599 W. Irving Park Rd., Itasca, Ill. 60143

[21] Appl. No.: 844,605

[22] Filed: Mar. 27, 1986

[51] Int. Cl.$^4$ .............................................. B60G 13/10
[52] U.S. Cl. .................................... 280/6 H; 280/702
[58] Field of Search ............. 280/663, 672, 690, 698, 280/701, 702, 709, 133, 6 H, 6 R, 6.1

[56] References Cited

U.S. PATENT DOCUMENTS

| | | | |
|---|---|---|---|
| 2,186,065 | 1/1940 | Fischer | 280/701 |
| 3,077,952 | 2/1963 | Neises | 280/6 H |
| 3,166,340 | 1/1965 | Rusconi | 280/6 H |
| 3,556,542 | 1/1971 | Capgras | 280/6 H |
| 3,652,101 | 3/1972 | Pivonka | 280/6 H |
| 4,152,004 | 5/1979 | Schroder | 280/6 H |

FOREIGN PATENT DOCUMENTS

| | | | |
|---|---|---|---|
| 502751 | 7/1930 | Fed. Rep. of Germany | 280/701 |
| 822968 | 1/1938 | France | 280/702 |
| 1203717 | 1/1960 | France | 280/702 |
| 1425503 | 12/1966 | France | 280/701 |
| 836521 | 6/1960 | United Kingdom | 280/702 |
| 1361535 | 7/1974 | United Kingdom | 280/702 |

*Primary Examiner*—Richard A. Bertsch
*Attorney, Agent, or Firm*—Douglas B. White

[57] ABSTRACT

There is provided an independent wheel suspension system for a work platform vehicle wherein left and right wheel support members are pivotally mounted to a chassis. Interposed between the wheel support members an extensible fluidic cylinder is arranged to urge the wheel support members about their mountings to thereby provide a constant ground contact force on each wheel.

10 Claims, 2 Drawing Sheets

WHEEL SUSPENSION SYSTEM

BACKGROUND OF THE INVENTION

The present invention relates generally to wheel suspension systems for vehicles and more particularly to a strut-type suspension for a vehicle which allows a wheel to independently adapt to terrain.

Wheel suspension systems have been developed in the prior art to control the attitude of wheel axles in order to provide handling characteristics, affect steering, and soften the ride characteristics. However, in the art of mobile work platforms, soft ride characteristics are not desirable since they create an unstable base which interferes with the platform lift functions. Nevertheless, mobile work platform vehicles are often driven across uneven terrain where it is desirable to maintain all wheels in contact with the ground at all times.

Independent suspension systems for mobile work platform vehicles have been absent in the prior art due most probably to the inherent problems in controlling the suspension sufficiently to provide safe lift operation. It is for this reason that prior independent suspension systems, such as that described in U.S. Pat. No. 4,458,913, which provides on each independent strut a spring cushion in conjunction with a shock absorber, cannot be used for a work platform vehicle. Although the spring and shock absorber will tend to maintain the controlled wheel in contact with the ground, the spring and shock absorber will tend to compress or yield in response to the motion of the platform when the platform is being elevated. Additionally, while this suspension system tends to maintain ground contact during motion of the vehicle, it generally does not provide sufficient contact force to ensure traction in rough terrain.

It is therefore an object of the present invention to provide a suspension system which locks into a stable position for lift operation. It is a further object of the invention to provide a suspension system which actively forces the wheels toward the ground to maintain sufficient contact force for wheel traction.

SUMMARY OF THE INVENTION

In accordance with the present invention, an independent wheel suspension system for a work platform vehicle is provided wherein left and right wheel support members are pivotally mounted to a chassis. Interposed between the wheel support members an extensible fluidic cylinder is arranged to urge the wheel support members about their mountings to thereby provide a constant ground contact force on each wheel. Accordingly, when the vehicle is traversing uneven terrain and one of the wheels encounters diminished contact force with the ground, the force of the cylinder pushing against the wheel support member forces the wheel downward to maintain ground contact force.

BRIEF DESCRIPTION OF THE DRAWINGS

Other objects and advantages of the invention will become apparent upon reading the following detailed description and upon reference to the drawings, in which.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
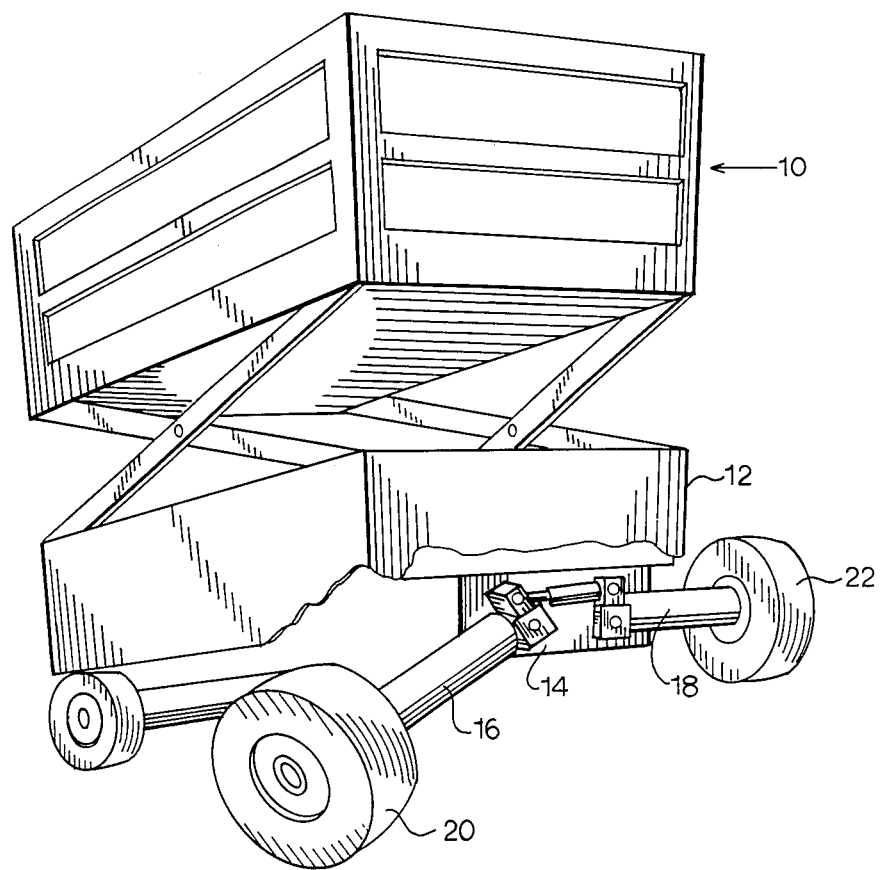
FIG. 1 is a pictorial view of the work platform vehicle of the present invention showing the suspension system in place.

Turning to FIG. 1 there is shown a pictorial view of a lift platform vehicle having an elevated platform 10 and a chassis 12. Secured to a mounting 14 on the underside of the chassis there are provided wheel support members 16 and 18, each having mounted thereon a fluidically driven wheel motor and wheel 20 and 22.

Figure 2:
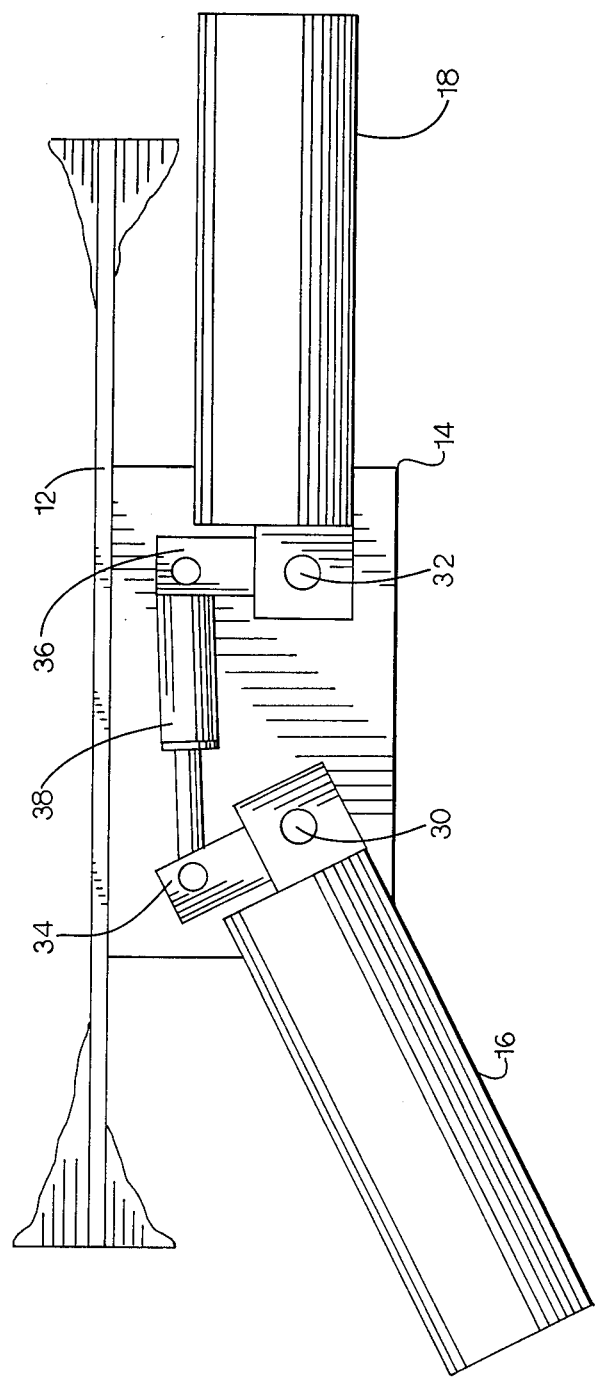
FIG. 2 is a front elevational view of the suspension system of FIG. 1.

As most clearly depicted in FIG. 2, the wheel support members are pivotally mounted to the chassis via the mounting plate 14 at their respective pivotal attachments 30 and 32. Protruding from the wheel support members proximate their pivotal attachment are position control levers 34 and 36 arranged to control the position of the wheel support members about their pivotal mountings. Arranged to actuate these control levers there is provided a hydraulic cylinder 38 pivotally connected between the control levers.

In the preferred embodiment this hydraulic cylinder 38 is maintained under constant pressure thereby assuring pressure against the position control levers. This pressure then maintains a pivotal force on the wheel support members about their pivotal attachments to maintain contact force between the wheel and the ground.

In operating the vehicle over uneven terrain, as one wheel encounters a depression, that wheel will begin to lose contact force. This results in the contact force of the opposing wheel being higher than the contact fore of the wheel entering the depression. This contact force is transmitted to the position control levers through the pivotal mounting of the wheel members such that a reduction in wheel contact force yields a reduction in resistive pressure at the corresponding position control lever. Consequently, since the cylinder maintains constant expansion pressure against the control levers, the reduction in resistive pressure allows expansion of the cylinder and corresponding movement of the position control levers to force the wheels back toward the ground.

In a further aspect of the present invention, it can be seen that a reduction in cylinder pressure allows the wheel support members to retract to their uppermost fully retracted position. This allows the wheel support members to retract to a stable position where they may be locked to allow safe operation of the lift mechanism. Furthermore, in the event of a pressure loss in the fluid pressure system, the wheel supports will automatically retract under the weight of the vehicle.

In summary, there has been shown and described a novel and uncomplicated independent wheel suspension system whereby the wheels are each independently and actively forced toward the ground to maintain contact. This is accomplished by the use of a single fluidically controlled cylinder arranged to apply a pivotal force on each wheel support member.

I claim:

1. A wheel suspension system for a vehicle comprising:
   a chassis;
   first and second wheel support members each pivotally mounted to said chassis and arranged to support wheels rotatably mounted thereon; and
   power means interposed between and coupled to said wheel support members and arranged to simultaneously drive said wheel support members about their respective pivotal attachments, by providing a substantially undiminishing force against said wheel support members throughout their range of motion.

2. The wheel suspension system of claim 1 wherein said power means comprises a fluidic cylinder coupled at the ends thereof to each wheel support member and arranged to simultaneously apply pressure against each wheel support member whereby said wheel support members are each driven toward contact with the ground.

3. The wheel suspension system of claim 2 further comprising lever members protruding from each of said wheel support members each, and wherein said fluidic cylinder is pivotally connected at each end thereof to said respective lever members.

4. The wheel suspension system of claim 3 wherein said fluidic cylinder is fluidically connected to allow contraction of the cylinder upon a decrease in fluidic pressure, whereby the wheel support members will tend to retract upon a decrease in such pressure.

5. The wheel suspension system of claim 4 further comprising means to lock said wheel support members in the fully retracted position.

6. The wheel suspension system of claim 1 wherein said wheel support members are arranged to support fluidically operable wheel motors and wheels mounted thereon.

7. The wheel suspension system of claim 6 wherein said power means comprises a fluidic cylinder coupled at the ends thereof to each wheel support member and arranged to simultaneously apply pressure against each wheel support member whereby said wheel support members are each driven toward contact with the ground.

8. The wheel suspension system of claim 7 further comprising lever members protruding from each of said wheel support members, and wherein said fluidic cylinder is pivotally connected at each end thereof to said respective lever members.

9. The wheel suspension system of claim 8 wherein said fluidic cylinder is fluidically connected to allow contraction of the cylinder upon a decrease in fluidic pressure, whereby the wheel support members will tend to retract upon a decrease in such pressure.

10. The wheel suspension system of claim 9 further comprising means to lock said wheel support members in the fully retracted position.

* * * * *